(12) United States Patent
Holland et al.

(10) Patent No.: US 11,140,375 B2
(45) Date of Patent: Oct. 5, 2021

(54) SHARING AN OPTICAL SENSOR BETWEEN MULTIPLE OPTICAL PROCESSORS

(71) Applicant: QUALCOMM Incorporated, San Diego, CA (US)

(72) Inventors: Wesley James Holland, Encinitas, CA (US); Satish Goverdhan, San Diego, CA (US); Venkata Rajesh Kumar Sastrula, San Diego, CA (US); Ramesh Ramaswamy, San Diego, CA (US); Songhe Cai, San Diego, CA (US); Ling Feng Huang, San Diego, CA (US); Chih-Chi Cheng, Mountain View, CA (US); Huang Huang, San Diego, CA (US); Rajakumar Govindaram, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 16/719,247

(22) Filed: Dec. 18, 2019

(65) Prior Publication Data
US 2021/0195159 A1 Jun. 24, 2021

(51) Int. Cl.
*H04N 13/139* (2018.01)
*H04N 13/207* (2018.01)
*H04N 13/25* (2018.01)

(52) U.S. Cl.
CPC ......... *H04N 13/139* (2018.05); *H04N 13/207* (2018.05); *H04N 13/25* (2018.05); *H04N 2201/001* (2013.01)

(58) Field of Classification Search
USPC ....................................... 348/207.1
See application file for complete search history.

(56) References Cited

U.S. PATENT DOCUMENTS

| | | | | |
|---|---|---|---|---|
| 2002/0060784 | A1* | 5/2002 | Pack | G01S 17/89 356/6 |
| 2004/0234100 | A1* | 11/2004 | Belau | G06T 5/006 382/104 |
| 2016/0227100 | A1* | 8/2016 | Liu | H04N 5/23212 |
| 2016/0277650 | A1* | 9/2016 | Nagaraja | H04N 5/23212 |
| 2019/0007590 | A1* | 1/2019 | Lee | H04N 13/128 |

* cited by examiner

*Primary Examiner* — Behrooz M Senfi
(74) *Attorney, Agent, or Firm* — Patterson & Sheridan, L.L.P

(57) ABSTRACT

In some aspects, the present disclosure provides a method for sharing a single optical sensor between multiple image processors. In some embodiments, the method includes receiving, at a control arbiter, a first desired configuration of a first one or more desired configurations for capturing an image frame by the optical sensor, the first one or more desired configurations communicated from a primary image processor. The method may also include receiving, at the control arbiter, a second desired configuration of a second one or more desired configurations for capturing the image frame by the optical sensor, the second one or more desired configurations communicated from a secondary image processor. The method may also include determining, by the control arbiter, an actual configuration for capturing the image frame by the optical sensor, the actual configuration based on the first desired configuration and the second desired configuration.

16 Claims, 6 Drawing Sheets

SHARING AN OPTICAL SENSOR BETWEEN MULTIPLE OPTICAL PROCESSORS

BACKGROUND

Field of the Disclosure

The teachings of the present disclosure relate generally to image capturing processes, and more particularly, to techniques for sharing a single optical sensor between multiple image processors.

Description of the Related Art

Historically, the power cost for capturing camera data to a system on a chip (SOC) has been high due to, for example, the sizing and capabilities of the image processing hardware on the SOC, which must be capable of handling high-resolution (12 MP-200 MP) optical sensors and performing advanced camera features (e.g., electronic image stabilization (EIS), high dynamic range (HDR), etc.). Further, the image processing hardware often needs to use external DRAM during image processing, and interfacing with the external DRAM during image processing comes with a high power cost, both on the DRAM chip as well as the SOC infrastructure to communicate to DRAM.

Mobile devices are increasingly leveraging specialized ultra-low power optical hardware for "always-on" camera use cases. For example, mobile devices that use such specialized optical hardware typically include at least one or more other optical sensors to support high-definition image capturing; something that the ultra-low power optical hardware cannot support. Processing for mobile devices that use multiple optical sensors is typically implemented as a parallel image processing path (i.e., a one-to-one optical sensor to image processor correspondence). However, such an implementation comes with additional material costs and form-factor costs. For example, implementing multiple optical sensors on a single device can increase the cost of the device relative to a device having a single optical sensor. In some examples, additional optical sensors can reduce the remaining hardware real estate on the device, which can in-turn reduce design options and impact form factor of the device.

Accordingly, what is needed are systems and methods for sharing optical sensors between multiple image processors without substantially impacting power consumption, material cost, and form-factor costs.

SUMMARY

In certain aspects, the disclosure describes a system on a chip (SoC), comprising a primary image processor, a secondary image processor, and a control arbiter. In some examples, the control arbiter is communicatively coupled to the secondary image processor, the primary image processor, and an optical sensor. In some examples, the control arbiter is configured to receive, from the primary image processor, a first desired configuration for capturing an image frame by the optical sensor. The control arbiter may also be configured to receive, from the secondary image processor, a second desired configuration for capturing the image frame by the optical sensor. The control arbiter may also be configured to determine an actual configuration for capturing the image frame by the optical sensor, the actual configuration based on the first desired configuration and the second desired configuration. The control arbiter may also be configured to configure the optical sensor according to the actual configuration, wherein the primary image processor and the secondary image processor are configured to receive, from the optical sensor, image data generated by the optical sensor based on the actual configuration.

In certain aspects, the disclosure describes a method of sharing a single optical sensor between multiple image processors. In some examples, the method includes receiving, at a control arbiter, a first desired configuration for capturing an image frame by an optical sensor, the first desired configuration communicated from a primary image processor. In some examples, the method includes receiving, at the control arbiter, a second desired configuration for capturing the image frame by the optical sensor, the second desired configuration communicated from a secondary image processor. In some examples, the method includes determining, by the control arbiter, an actual configuration for capturing the image frame by the optical sensor, the actual configuration based on the first desired configuration and the second desired configuration. In some examples, the method includes configuring, by the control arbiter, the optical sensor according to the actual configuration, wherein the primary image processor and the secondary image processor are configured to receive, from the optical sensor, image data generated by the optical sensor based on the actual configuration.

In certain aspects, the disclosure provides for an apparatus for sharing a single optical sensor between multiple image processors. The apparatus may include means for receiving a first desired configuration for capturing an image frame by the optical sensor, the first desired configuration communicated from a primary image processor. The apparatus may also include means for receiving a second desired configuration for capturing the image frame by the optical sensor, the second desired configuration communicated from a secondary image processor. The apparatus may also include means for determining an actual configuration for capturing the image frame by the optical sensor, the actual configuration based on the first desired configuration and the second desired configuration. The apparatus may also include means for configuring the optical sensor according to the actual configuration, wherein the primary image processor and the secondary image processor are configured to receive, from the optical sensor, image data generated by the optical sensor based on the actual configuration.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects.

Figure 1:
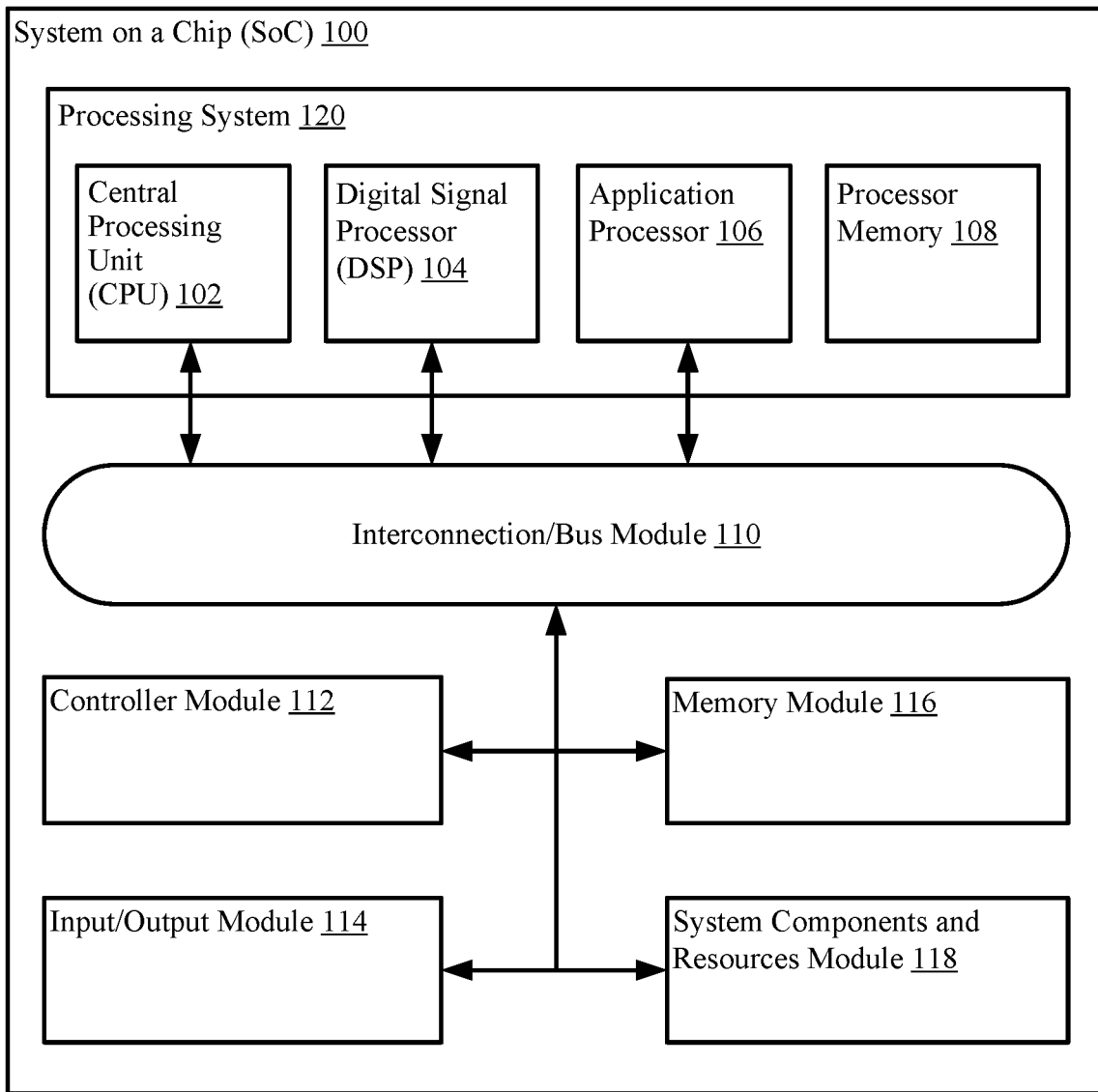
FIG. 1 is a block diagram illustrating an exemplary system-on-chip (SoC) integrated circuit (IC) in accordance with certain aspects of the present disclosure.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

DETAILED DESCRIPTION

Aspects described herein relate to methods and apparatuses for sharing an optical sensor between multiple image processors. As noted above, specialized camera sensors, such as ultra-low power camera sensors (e.g., always on cameras), can be used on a mobile device to support specialized use-case scenarios, such as biometric recognition and gesture detection. However, such specialized cameras may not support high definition image capturing; for example, they may not support resolutions above standard video graphics array (VGA) resolution or quarter VGA (QVGA) resolution.

Thus, according to certain embodiments, a system on a chip (SoC) is proposed that supports multiple image processors that share an optical sensor. In one embodiment, the SoC includes a master of the optical sensor called a camera sensor control arbiter (also referred to throughout the disclosure as a "control arbiter"). In some examples, the control arbiter is configured receive optical sensor configuration requests from multiple image processors, and apply a configuration to the optical sensor based on the requests.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with various other embodiments discussed herein.

The term "system on chip" (SoC) is used herein to refer to a single integrated circuit (IC) chip that contains multiple resources and/or processors integrated on a single substrate. For example, a single SoC may contain circuitry for digital, analog, mixed-signal, and radio-frequency functions. A single SoC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.), any or all of which may be included in one or more cores.

A number of different types of memories and memory technologies are available or contemplated in the future, all of which are suitable for use with the various aspects of the present disclosure. Such memory technologies/types include phase change memory (PRAM), dynamic random-access memory (DRAM), static random-access memory (SRAM), non-volatile random-access memory (NVRAM), flash memory (e.g., embedded multimedia card (eMNIC) flash, flash erasable programmable read only memory (FEPROM)), pseudostatic random-access memory (PSRAM), double data rate synchronous dynamic random-access memory (DDR SDRAM), and other random-access memory (RAM) and read-only memory (ROM) technologies known in the art. A DDR SDRAM memory may be a DDR type 1 SDRAM memory, DDR type 2 SDRAM memory, DDR type 3 SDRAM memory, or a DDR type 4 SDRAM memory.

Each of the above-mentioned memory technologies include, for example, elements suitable for storing instructions, programs, control signals, and/or data for use in or by a computer or other digital electronic device. Any references to terminology and/or technical details related to an individual type of memory, interface, standard or memory technology are for illustrative purposes only, and not intended to limit the scope of the claims to a particular memory system or technology unless specifically recited in the claim language.

Mobile computing device architectures have grown in complexity, and now commonly include multiple processor cores, SoCs, co-processors, functional modules including dedicated processors (e.g., communication modem chips, global positioning system (GPS) processors, display processors, etc.), complex memory systems, intricate electrical interconnections (e.g., buses and/or fabrics), and numerous other resources that execute complex and power intensive software applications (e.g., video streaming applications, etc.).

FIG. 1 is a block diagram illustrating an exemplary system-on-chip (SoC) 100 suitable for implementing various aspects of the present disclosure. The SoC 100 includes a processing system 120 that includes a plurality of heterogeneous processors, such as a central processing unit (CPU) 102, a digital signal processor (DSP) 104, an application processor 106, and a processor memory 108. The processing system 120 may include one or more cores, and each processor/core may perform operations independent of the other processors/cores. The processors 102, 104, and 106 may be organized in close proximity to one another (e.g., on a single substrate, die, integrated chip, etc.) to enable higher frequency/clock-rate operation. The proximity of the cores may also allow for the sharing of on-chip memory and resources (e.g., voltage rail), as well as for more coordinated cooperation between cores.

The processing system 120 is interconnected with one or more controller module(s) 112, input/output (I/O) module(s) 114, memory module(s) 116, and system component and resources module(s) 118 via a bus module 110, which may include an array of reconfigurable logic gates and/or implement a bus architecture (e.g., CoreConnect, advanced microcontroller bus architecture (AMBA), etc.). Bus module 110 communications may be provided by advanced interconnects, such as high performance networks on chip (NoCs). The interconnection/bus module 110 may include or provide a bus mastering system configured to grant SoC components (e.g., processors, peripherals, etc.) exclusive control of the bus (e.g., to transfer data in burst mode, block transfer mode, etc.) for a set duration, number of operations, number of bytes, etc.

The controller module 112 may be a specialized hardware module configured to manage the flow of data to and from the memory module 116, the processor memory 108, or a memory device located off-chip (e.g., a flash memory device, off-chip DRAM, etc.). In some examples, the memory module may include a host device configured to receive various memory commands from multiple masters, and address and communicate the memory commands to the memory device. The multiple masters may include processors 102, 104, and 106, and/or multiple applications running on one or more of the processors 102, 104, and 106. The controller module 112 may comprise one or more processors configured to perform operations disclosed herein. Examples of processors (e.g., processors 102, 104, and 106) include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The I/O module 114 is configured for communicating with resources external to the SoC. For example, the I/O module 114 includes an input/output interface (e.g., a bus architecture or interconnect) or a hardware design (e.g., a memory, a wireless device, and a digital signal processor) for performing specific functions. In some examples, the I/O module includes circuitry to interface with peripheral devices, such as a memory device located off-chip, or other hardware located off chip (e.g., image sensors, ambient light sensors, motion sensors, etc.).

The memory module 116 is a computer-readable storage medium implemented in the SoC 100. The memory module 116 may provide non-volatile storage, such as flash memory or DRAM, for one or more of the processing system 120, controller module 112, I/O module 114, and/or the system components and resources module 118. The memory module 116 may include a cache memory to provide temporary storage of information to enhance processing speed of the SoC 100. In some examples, the memory module 116 may be implemented as a memory device integrated into the SoC 100 and/or an external memory device.

SoC 100 includes a system components and resources module 118 for managing sensor data, analog-to-digital conversions, wireless data transmissions, and for performing other specialized operations (e.g., supporting interoperability between different devices). System components and resources module 118 may also include components such as voltage regulators, oscillators, phase-locked loops, peripheral bridges, data controllers, system controllers, access ports, timers, and other similar components used to support the processors and software clients running on the computing device. The system components and resources 118 may also include circuitry for interfacing with peripheral devices, such as cameras, electronic displays, wireless communication devices, external memory chips, etc.

SoCs are often integrated with optical sensors (e.g., digital cameras) in a mobile device to support a range of functions, such as photography, user authentication, communication, etc. Such mobile devices may include, for example, cellular phones, smart phones, laptops, handheld communication devices, handheld computing devices, satellite radios, global positioning systems, PDAs, internet of things (IoT) devices, always-on (AON) devices (e.g., AON sensors), and/or any other mobile device.

EXAMPLE SYSTEM FOR SUPPORTING A SHARED OPTICAL SENSOR

Figure 2:
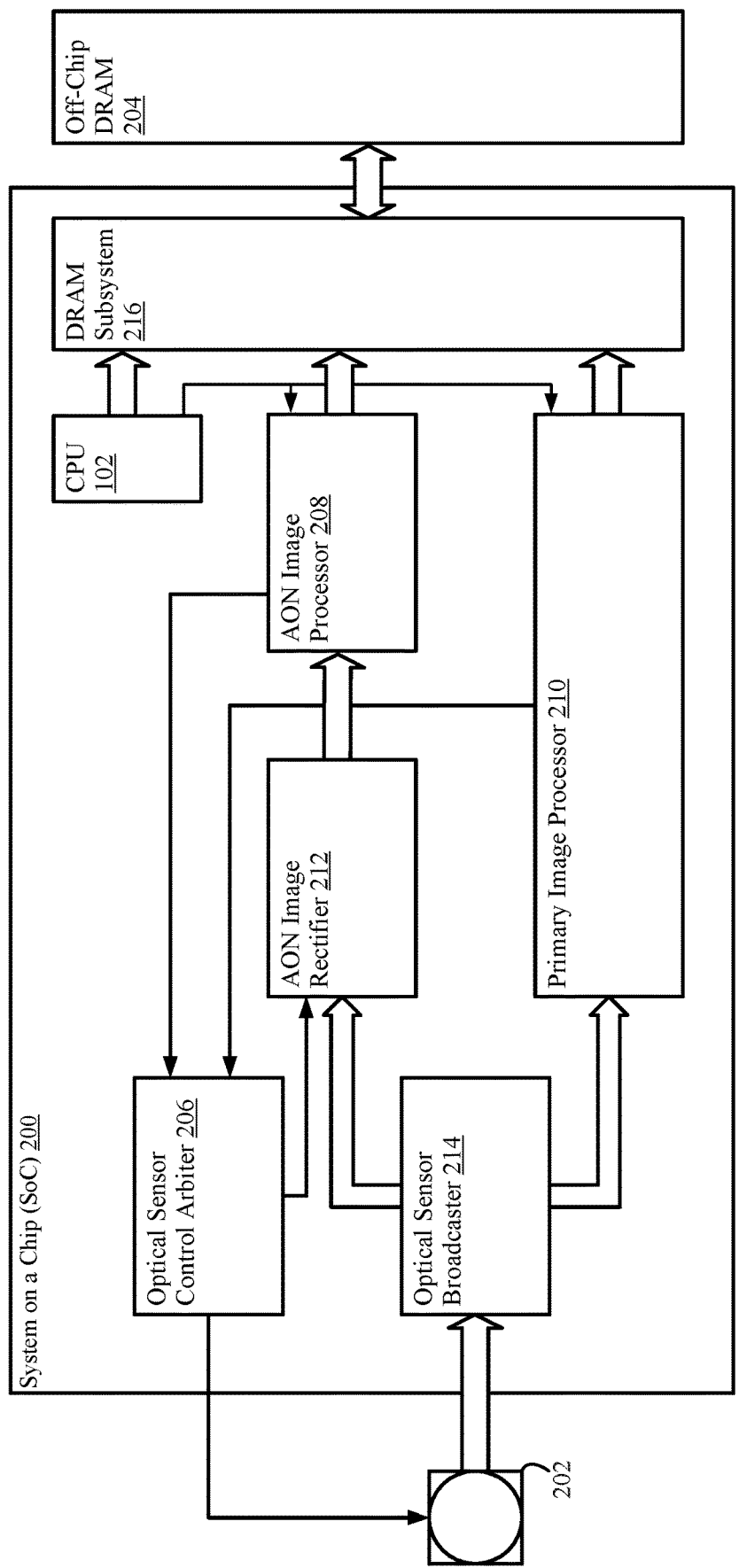
FIG. 2 is block diagram illustrating an exemplary SoC in accordance with certain aspects of the present disclosure.

FIG. 2 is block diagram illustrating an exemplary SoC 200 including an integrated optical sensor 202 and off-chip DRAM 204. SoC 200 may include some or all of the components of SoC 100, which are not necessarily shown here for simplicity. The SoC 200 may include two or more image processors configured to communicate requests for configuration of the optical sensor to a control arbiter 206. In some examples, the requests indicate the configuration required by an application or program running on an application processor (e.g., application processor 106 of FIG. 1) that an image processor is supporting.

As shown in the example of FIG. 2, the SoC 200 includes two image processors: an always on (AON) processor 208, and a primary image processor 210. The AON processor 208 may be configured to support ultra-low power imaging applications. For example, the AON processor 208 may support facial and biometric recognition, gesture detection, and other low power applications. In some examples, the AON processor 208 may be configured for low-resolution and low-power use cases that allow the AON processor 208 to always be on.

The primary image processor 210 may be configured to support relatively higher power imaging applications. For example, the primary image processor 210 may support high definition (HD), high dynamic range (HDR), enhanced image stabilization (EIS), and other such imaging applications. In other examples within the scope of the present disclosure, the SoC 200 may include any suitable number of image processors configured for specialized and/or general operations that share the same optical sensor.

The control arbiter 206 is configured to receive configuration requests from the AON processor 208 and the primary image processor 210, indicating an optical sensor configuration desired by each of the processors. Based on the configuration requests, the control arbiter 206 may determine a configuration (e.g., one or more of a frame rate, resolution, exposure time, field of view, aspect ratio, (e.g., cropping of the field of view), brightness, contrast, etc.) for the optical sensor 202, and communicate the determined configuration to the optical sensor 202. That is, the control arbiter 206 arbitrates between desired optical sensor configurations requested by the AON processor 208 and the primary image processor 210. The optical sensor 202 may then proceed to capture image data (e.g., pixel data) based on the determined configuration. Once the image frame is captured, the optical sensor 202 may communicate the image data to a broadcaster 214. In some examples, the broadcaster 214 is configured to communicate the image data from the optical sensor 202 to at least the primary image processor 210 and to an AON rectifier 212. This way, the broadcaster 214 provides image data from a single optical sensor 202 to multiple image processors.

Although the image processor examples provided are generally directed to AON type processors and primary, or high-resolution type image processors, it can be appreciated that the types of processors may extend beyond these and be used with other combinations of two or more image processors, and even general purpose or special purpose processors. In some examples, the AON processor 208 and/or the primary image processor 210 may be substituted with other image processors, including general purpose processors (e.g., a digital signal processor (DSP), any suitable image processor, processors 102, 104, and 106 of FIG. 1, etc.) or a special purpose processors (e.g., medical imaging, thermal imaging, etc.).

In some embodiments, the AON rectifier 212 may use image processing techniques to adjust certain aspects of image data received from the shared optical sensor 202. For example, the AON processor 208 may not be configured to handle high resolution image data provided by the optical sensor 202. Thus, the AON rectifier 212 may downgrade or scale the high resolution image data received from the optical sensor 202 before providing the scaled image data to the AON processor 208. However, if the AON rectifier 212 is unable to harvest image data usable to the AON processor 208 (e.g., the AON rectifier 212 is unable to downgrade or scale the image data received from the optical sensor 202 to a format usable by the AON processor 208), the AON rectifier 212 may provide a user-configurable innocuous frame to the AON processor 208 instead of the image data.

In some embodiments, the control arbiter 206 may also communicate a rectification recipe to an AON rectifier 212, which may be initially provided by the AON processor 208. In some examples, the rectification recipe corresponds to a desired optical sensor configuration requested by the AON processor 208, wherein the desired optical sensor configuration is the basis for the optical sensor 202 configuration determined by the control arbiter 206. That is, the AON processor 208 may request a desired optical sensor configuration that includes a rectification recipe. For example, the AON processor 208 may not be configured to handle image data generated by the optical sensor 202 when the optical sensor 202 is using the desired optical sensor configuration. However, the AON processor 208 is configured to handle such image data if the image data is adjusted (e.g., downgraded, scaled, etc.) according to the rectification recipe. Accordingly, the control arbiter 206 may determine to use the desired optical sensor configuration as indicated by the AON processor 208 if the desired optical sensor configuration can also be used by the primary image processor 210. Thus, according to certain embodiments, the AON processor 208 may request a desired optical sensor configuration even if that particular configuration is incompatible with the AON processor 208, so long as the AON processor 208 can also provide a rectification recipe that the AON rectifier 212 can use to adjust the resulting image data so that it is compatible with the AON processor 208.

The SoC 200 may also include a central processing unit (CPU) 102 configured to control power and functionality of the multiple image processors (e.g., AON processor 208 and primary image processor 210). For example, the CPU 102 may halt or abort processing by one or both of the image processors if the CPU 102 detects abnormal functioning (e.g., inaccuracy of image data, including pixel data, image processing coefficients, intermediate processing results, etc.) of either. In some examples, the CPU 102 may also include programmable and user-configurable image processing stages.

The SoC 200 may also include a DRAM subsystem 216 (e.g., controller module 112 and/or I/O module 114) configured to manage the flow of data to and from the off-chip DRAM 204. It should be noted that in other examples within the scope of the present disclosure, the DRAM subsystem 216 may manage the flow of data to on-chip memory devices (e.g., SRAM).

Figure 3:
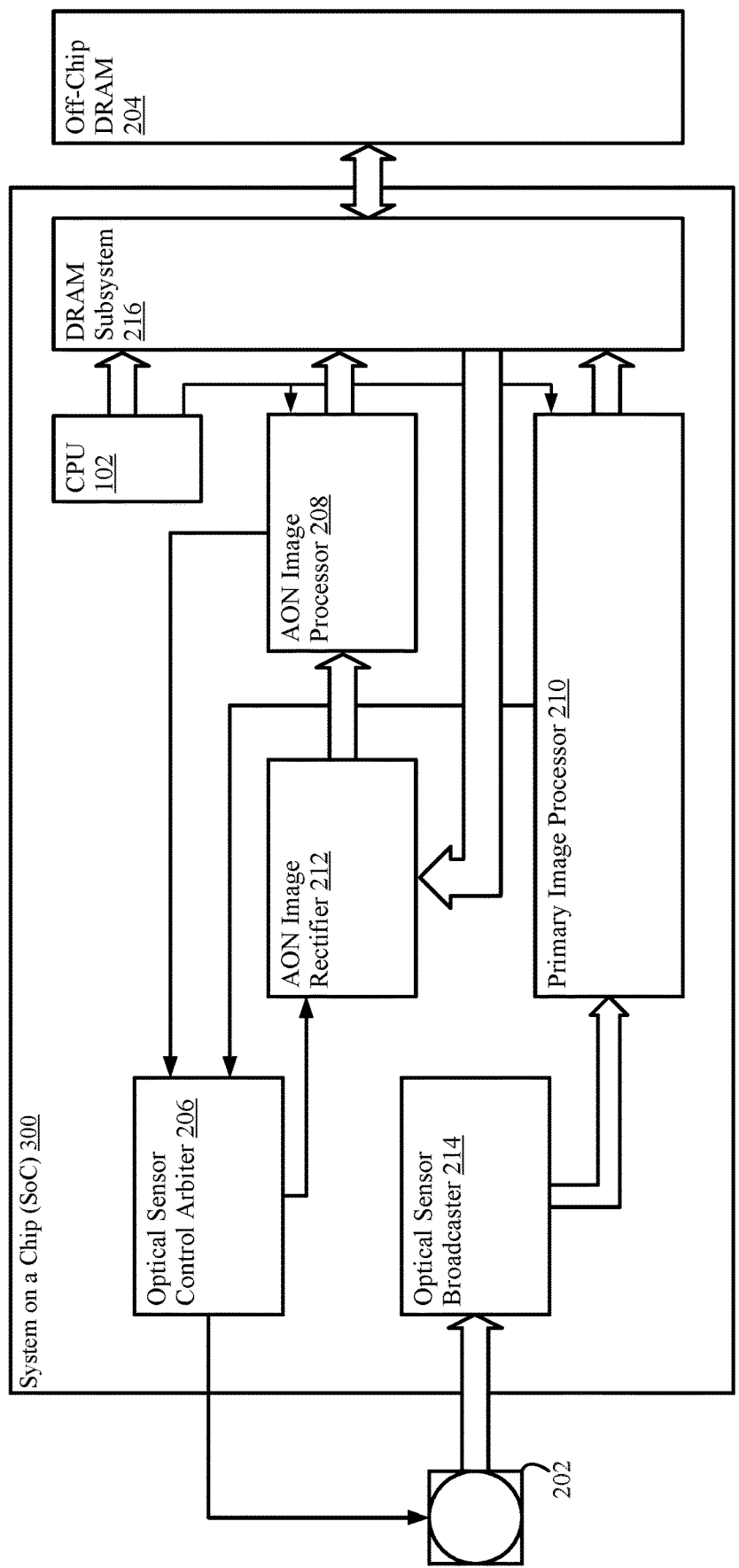
FIG. 3 is a block diagram illustrating another exemplary SoC in accordance with certain aspects of the present disclosure.

FIG. 3 is a block diagram illustrating another exemplary SoC 300 including an integrated optical sensor 202 and off-chip DRAM 204. SoC 300 may include some or all of the components of SoC 100, which are not necessarily shown here for simplicity. FIG. 3 includes the same components illustrated in FIG. 2, however in the example depicted in FIG. 3, a communication pathway between the broadcaster 214 and the AON rectifier 212 is not included.

In the example, of FIG. 3, the primary image processor 210 communicates captured image data to the AON rectifier 212 via the DRAM subsystem 216. In this example, the primary image processor 210 may be configured to perform imaging processing on the captured image data to downgrade the image data before providing the image data to the AON rectifier 212 via DRAM subsystem 216. Alternatively, the AON rectifier 212 may include processing steps to downgrade the image data processed by the primary image processor 210.

Figure 4:
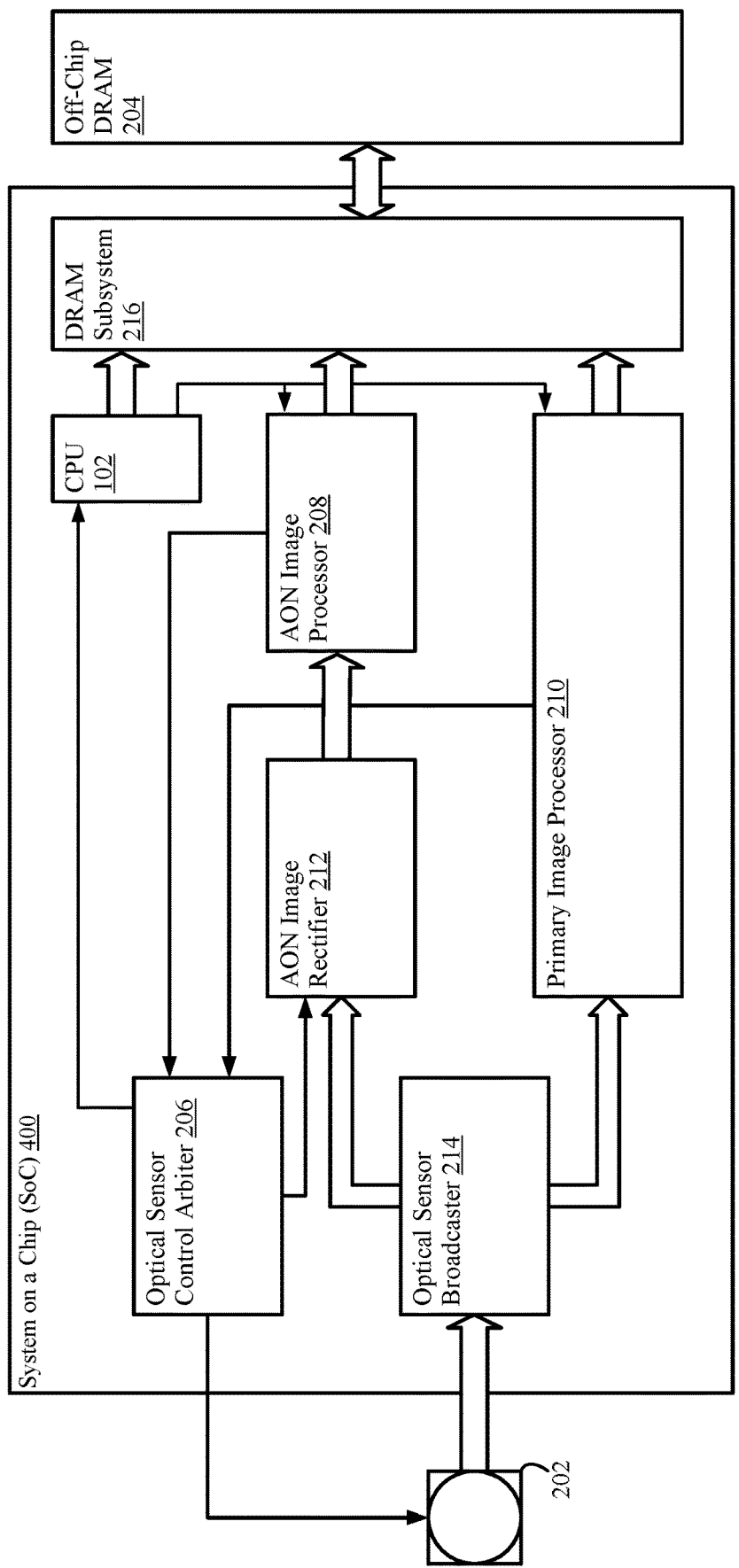
FIG. 4 is a block diagram illustrating another exemplary SoC in accordance with certain aspects of the present disclosure.

FIG. 4 is a block diagram illustrating another exemplary SoC 400 including an integrated optical sensor 202 and off-chip DRAM 204. SoC 400 may include some or all of the components of SoC 100, which are not necessarily shown here for simplicity. FIG. 4 includes the same components illustrated in FIG. 2, however in the embodiment depicted in FIG. 4, an additional communication pathway is included between the control arbiter 206 and the CPU 102.

If the primary image processor 210 workload is fundamentally incompatible with the AON processor 208 (e.g., the captured image data cannot be downgraded to a format acceptable to the AON processor 208), then the option of providing the AON processor 208 with an innocuous frame may cause instability in the AON processor 208 that may render the AON processor 208 unusable. Thus, as shown in FIG. 4, an alternative implementation is to provide the control arbiter 206 with an ability to communicate with the CPU 102. Here, the control arbiter 206 may request that the CPU 102 halt or abort the AON processor 208, and inform the user that the AON processing has stopped in the event the captured image data cannot be downgraded to a format acceptable to the AON processor 208.

EXAMPLE OPERATION OF MULTI-PROCESSOR SOC WITH A SHARED OPTICAL SENSOR

As noted above, the control arbiter 206 may be configured to function as a single master for the optical sensor 202, and arbitrate between one or more requests from multiple processors for desired optical sensor configurations.

Accordingly, the control arbiter 206 is configured to receive, from the primary image processor 210 a first request for a desired configuration for capturing an image frame by the optical sensor 202. The control arbiter 206 is also configured to receive, from the AON processor 208 a second request for a desired configuration for capturing the image frame by the optical sensor 202. It should be noted that the primary image processor 210 and the AON processor 208 may require different configurations of image data received from the optical sensor 202. For example, the AON processor 208 may be configured to operate natively on image data having a VGA resolution at 5 frames per second (fps), while the primary image processor 210 may be configured to operate natively on image data having a 4K resolution at 60 fps.

A request for a desired configuration of the optical sensor 202 may include a list of sensor configurations acceptable to the corresponding processor, ordered by preference. For example, the configuration requests may include one or more parameters that the control arbiter 206 and/or the AON processor 208 desire for operation of the optical sensor 202 (e.g., configuration of the optical sensor 202 during capture of a particular image frame). The one or more parameters may include, for example, frame rate, resolution, exposure time, field of view, aspect ratio, (e.g., cropping of the field of view), brightness, contrast, etc.

In some examples, the list of sensor configurations may include a list of one or more preferred values of the same parameters (e.g., a list of one or more frame rates ordered according to preference of the image processor). For example, the first desired configuration request may include a first plurality of desired optical sensor configurations listed in order of preference of the primary image processor 210. Similarly, the second desired configuration request may include a second plurality of desired optical sensor configurations listed in order of preference of the AON processor 208. That is, either of the image processors may indicate one or more parameters indicative of an optical sensor configuration that are acceptable to the image processor.

In some embodiments, the control arbiter 206 determines, based on the first desired configuration and the second desired configuration, an actual optical sensor configuration for capturing image data (e.g., pixel information of an image frame) by the optical sensor 202. The control arbiter 206 may then configure the optical sensor 202 according to the determined actual configuration (e.g., one or more of a frame rate, resolution, exposure time, field of view, aspect ratio, (e.g., cropping of the field of view), brightness, contrast, etc., based on the first desired configuration and the second desired configuration). Accordingly, when the optical sensor 202 will proceed to capture image data based on the determined actual configuration, and will communicate, via the broadcaster 214, the image data to the primary image processor 210 and the AON processor 208.

In some embodiments, a desired configuration request from the primary image processor 210 may include an indication of whether the optical sensor 202 is allowed to be reconfigured after the configuration of the optical sensor 202 according to the one or more actual operational parameters. For example, if the primary image processor 210 includes such an indication in its desired configuration request, the control arbiter 206 will determine an actual configuration based on the first desired configuration and the second desired configuration, but will not change the determined actual configuration of the optical sensor 202, even if the AON processor 208 provides one or more subsequent configuration requests. That is, unless the primary image processor 210 provides a subsequent configuration request, the control arbiter 206 will not change the determined actual configuration of the optical sensor 202.

In some embodiments, a desired configuration request from the AON processor 208 may include a rectification recipe for one or more of the optical sensor configurations provided in the request. The AON processor 208 may generate a rectification recipe for any optical sensor configuration that the AON processor 208 finds acceptable. For example, an application using the AON processor 208 may require that the optical sensor 202 capture image data using a VGA resolution at 5 frames-per-second (fps). In this example, the AON processor 208 may list this optical sensor configuration as the most preferred configuration in its desired configuration request. Because this is the most preferred optical sensor configuration, the AON processor 208 may not need to include a rectification recipe corresponding to it.

However, it should be noted that the AON processor 208 may include other optical configurations in its request. For example, the AON processor 208 may also include a request that the optical sensor 202 operate using a 4K resolution at 60 fps. In this case, the AON processor 208 may generate a rectification recipe corresponding to this request, wherein the rectification recipe is configured to instruct an AON rectifier (e.g., the AON image rectifier 212 of FIG. 2) to downgrade or scale image data captured at 4K resolution and 60 fps to a format usable by the AON processor 208. In this example, the rectification recipe may downscale the captured image data from a 4K frame to a VGA frame, and skip all but every 12' frame. Accordingly, the AON rectifier 212 is configured to downgrade the image data to a format suitable for the AON processor 208; in this example, the image data is downgraded to a VGA resolution at 5 fps, which is the preferred configuration of the AON processor 208. In this way, the optical sensor 202 provides image data that is usable by both of the AON processor 208 and the primary image processor 210.

As such, the AON processor 208 is configured to provide a rectification recipe to the AON rectifier 212 by generating one or more rectification recipes that correspond to one or more desired optical sensor configurations in a configuration request, and communicating the desired configuration request, along with the corresponding rectification recipes to the control arbiter 206. The control arbiter 206 may then determine the actual optical sensor 202 configuration, and forward a suitable rectification recipe to the AON rectifier 212, wherein the suitable rectification recipe is selected based on the determined actual optical sensor 202 configuration. Accordingly, the control arbiter 206 is able to determine an actual optical sensor configuration by determining which optical sensor configuration of the first desired configuration request and the second desired configuration request will provide image data that will work for both the AON processor 208 and the primary image processor 210. In some examples, a determination of an actual configuration is based on a highest quality configuration in the first desired configuration request that is common to (e.g., also found in) the second desired configuration request.

In some examples, the rectification recipe may include one or more of a list of processing steps for downgrading and/or scaling the image data generated by the optical sensor, and/or an indication of an innocuous frame to use as a stand-in for the image data. That is, the AON processor 208 may include other optical configurations in its request. For example, the AON processor 208 may also include an indication of an innocuous frame to be used by the AON rectifier 212 to replace captured image data if none of the optical sensor configurations desired by the AON processor 208 can be used by the optical sensor 202. If none of the optical sensor configurations desired by the AON processor 208 can be used, the AON rectifier 212 may send the innocuous frame indicated by the AON processor 208 in its request to the control arbiter 206 instead of sending the captured image data. Accordingly, the AON processor 208 does not encounter an error due to receiving image data that it cannot process. It should be noted that the innocuous frame may include an image frame having any suitable pattern, image, color, or scene. For example, the innocuous frame may include a solid black frame, a solid white frame, an outdoor scene, an indoor scene, etc.

Figure 5:
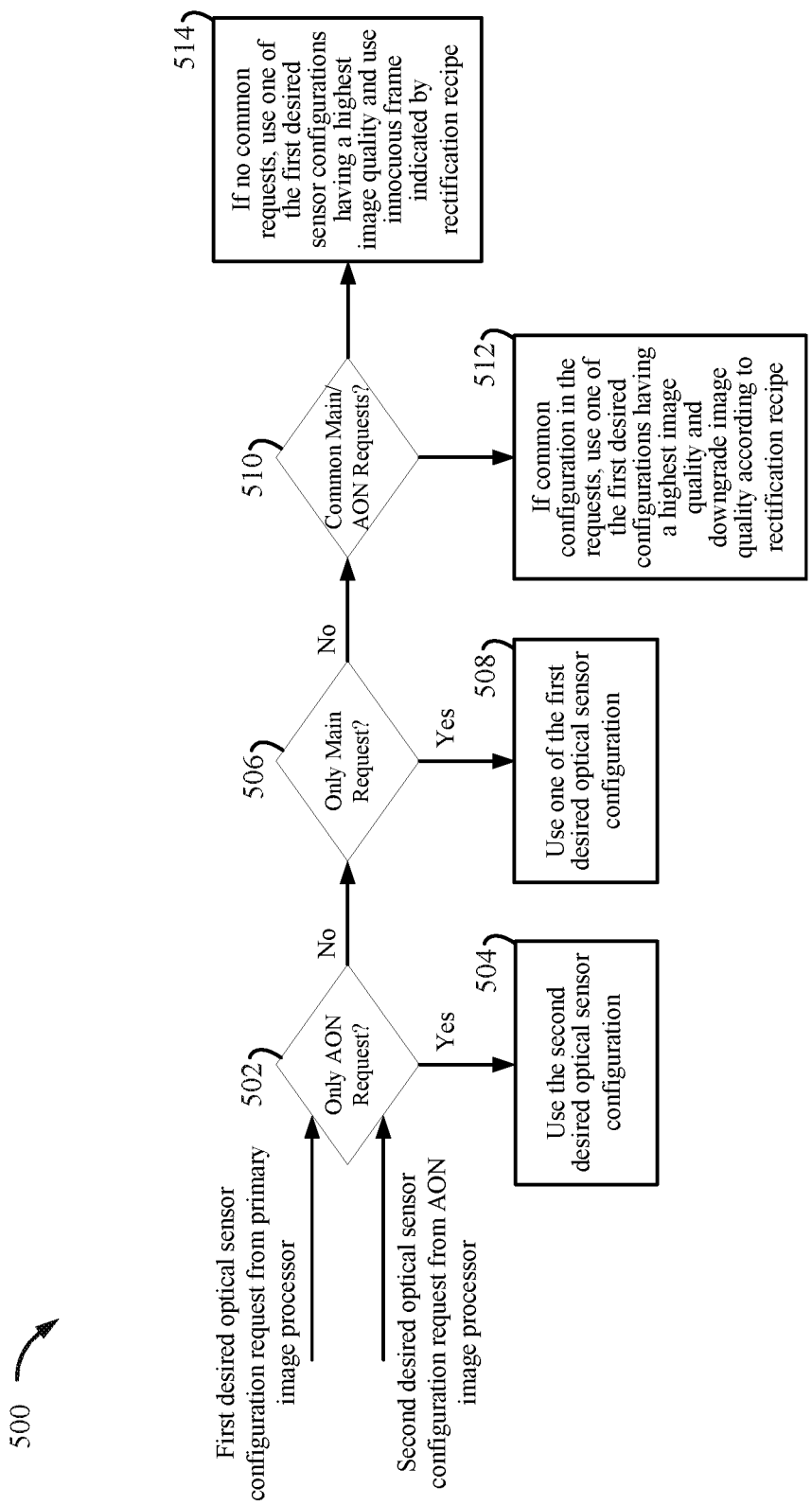
FIG. 5 is a flow chart illustrating an example method for determining, by a control arbiter, an optical sensor configuration in accordance with certain aspects of the present disclosure.

FIG. 5 is a flow chart illustrating an example method 500 for determining, by a control arbiter (e.g., the control arbiter 206 of FIGS. 2-4), an optical sensor configuration (e.g., the optical sensor 202 of FIGS. 2-4) based on requests for desired configurations communicated by multiple image processors (e.g., the AON processor 208 and the primary image processor 210 of FIGS. 2-4).

Initially, the control arbiter may receive one or more of a first desired optical sensor configuration request from a primary image processor (e.g., the primary image processor 210 of FIGS. 2-4), and a second desired optical sensor configuration request from an AON processor (e.g., AON image processor 208 of FIGS. 2-4).

At block 502, the control arbiter determines whether it only received a configuration request from the AON processor.

If yes, at block 504, the control arbiter may determine to configure the optical sensor according to the second desired configuration request. If the second desired configuration request includes a list of multiple acceptable configurations, the control arbiter may determine to use the preferred configuration of the AON processor.

If however, the control arbiter determines, at block 506, that it received only the first desired optical sensor configuration request from the primary image processor, at block 508 the control arbiter may determine to configure the optical sensor according to the first desired configuration request. If however, at block 506, the control arbiter determines that the first desired configuration request includes a list of multiple acceptable configurations, the control arbiter may determine to use the preferred configuration of the primary image processor.

Alternatively, if the control arbiter receives both of the first desired optical sensor configuration request from the primary image processor, and the second desired optical sensor configuration request from the AON processor, the control arbiter may determine, at block 510, whether there is a common desired optical sensor configuration between the first desired optical sensor configuration and the second desired optical sensor configuration.

If the control arbiter determines that each of the first desired optical sensor configuration request and the second desired optical sensor configuration request include a common configuration acceptable to both the primary image processor and the AON processor, then the control arbiter, at block 512, may determine to use a configuration associated with the highest image quality from the first desired configuration request that has a common corresponding configuration in the second sensor configuration to configure the optical sensor, and forward a corresponding rectification recipe to the AON rectifier.

Alternatively, if the control arbiter determines that the first desired optical sensor configuration request and the second desired optical sensor configuration request do not include a common configuration acceptable to both the primary image processor and the AON processor, then the control arbiter, at block 514, may determine to use the a configuration associated with the highest image quality from the first desired configuration request to configure the optical sensor, and forward a corresponding innocuous frame to the AON rectifier.

In some examples, only one image processor may be using the optical sensor. However, if that same image processor later determines to request a new optical sensor configuration, the control arbiter may receive the new request, determine a new optical sensor configuration based on the new request, and configure the optical sensor based on the new request.

If however, only the primary image processor is using the optical sensor, and AON processor communicates a new (or updated) optical sensor configuration request to the control arbiter, the control arbiter may determine whether the actual optical sensor configuration (e.g., the current configuration of the optical sensor) is common to the new AON processor configuration request. If the actual optical sensor configuration is common to the new configuration request from the AON processor, the actual optical sensor configuration will continue to be used, and the control arbiter may communicate the appropriate rectification recipe to the AON Rectifier.

Alternatively, if the actual sensor configuration is not common to the any configuration in the AON processor request, but the primary image processor allows for reconfiguration and there is an acceptable optical sensor configuration that the primary image processor can used that is common to the AON configuration request, then the control arbiter may determine to use the top preferred configuration of the primary image processor that is also acceptable (e.g., common) to a configuration in the AON processor request. Accordingly, the control arbiter may re-configure the optical sensor and communicate the appropriate rectification recipe to the AON rectifier.

However, if no common configuration between the primary image processor and the AON processor is found by the control arbiter, then the control arbiter maintains the actual optical sensor configuration, and communicates an innocuous frame indicated by the AON processor to the AON rectifier.

If only the AON processor is using the optical sensor, and the primary image processor communicates a new (or updated) optical sensor configuration request to the control arbiter, the control arbiter may determine whether to change the actual configuration of the optical sensor according to the process described above with respect to blocks 510, 512, and 514. It should be noted, however, that if such a determination results in a change of the actual configuration of the optical sensor, the optical sensor may be reconfigured by the control arbiter at a next frame generated by the optical sensor, or immediately after determination of the reconfiguration, where data from an innocuous frame is used to fill in for any image data that is not received by the AON processor.

In some embodiments, the AON rectifier may be configured with a preset number of user-configurable image processing steps. For example, the AON rectifier may be configured to modify received image data. In some examples, the AON rectifier is configured to modify received image data using frame skipping (e.g., to reduce frame rate to a desirable level according to a rectification recipe), frame rate conversion (e.g., to increase a frame rate of the received image data to a desirable level according to a rectification recipe), cropping (e.g., to reduce a field of view to a desired level according to a rectification recipe), binning (e.g., to increase exposure to a desired level according to a rectification recipe), and downscaling (e.g., to reduce resolution to a desirable level according to a rectification recipe). It should be noted that additional processing steps may also be added without departing from novel features disclosed herein. Moreover, while such processing steps may be performed by the AON rectifier, the processing may be supplemented by processing stages of execution on a CPU (e.g., CPU 102 of FIGS. 1 and 2).

Figure 6:
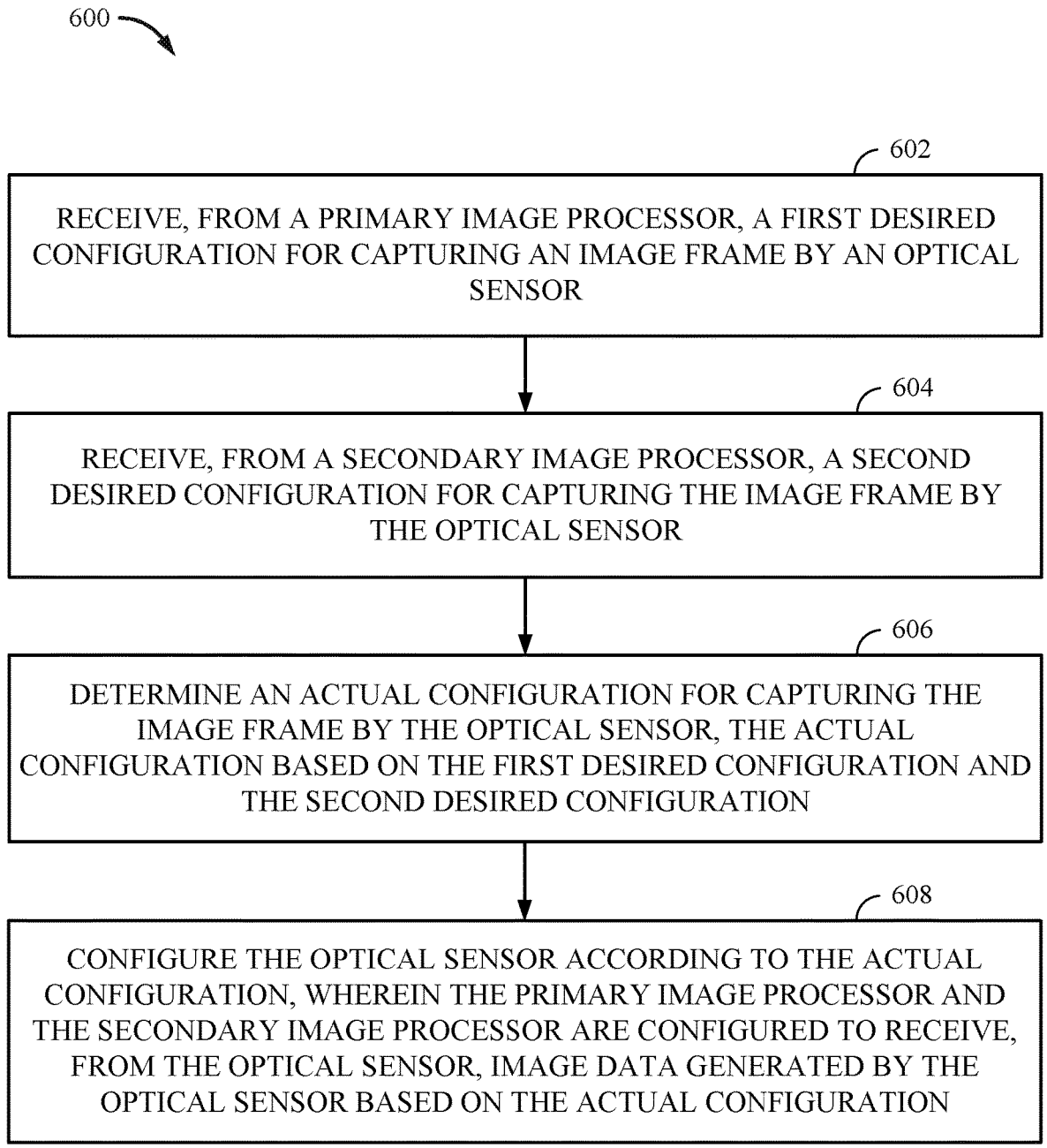
FIG. 6 is a flow chart illustrating example operations for sharing a single optical sensor in accordance with certain aspects of the present disclosure.

FIG. 6 is a flow chart illustrating example operations 600 for sharing a single optical sensor (e.g., optical sensor 202 of FIGS. 2-4) between multiple image processors (e.g., primary image processor 210 and AON processor 208 of FIGS. 2-4). The operations 600 may be performed, for example, by one or more processors (e.g., CPU 102, DSP 104, and/or application processor 106 of FIG. 1), using software stored on a computer-readable storage device (e.g., a processor memory 108 and/or memory module 116 of the SoC 100). That is, operations 600 may be implemented as software components that are executed and run on the one or more processors. In certain aspects, the transmission and/or reception of data by various hardware components may be implemented via a bus interface (e.g., bus module 110 of FIG. 1).

In this example, the operations 600 start at step 602 by receiving, from a primary image processor, a first desired configuration for capturing an image frame by an optical sensor.

The operations 600 then proceed to step 604 by receiving, from a secondary image processor, a second desired configuration for capturing the image frame by the optical sensor.

The operations 600 then proceed to step 606 by determining an actual configuration for capturing the image frame by the optical sensor, the actual configuration based on the first desired configuration and the second desired configuration.

The operations 600 then proceed to step 608 by configuring the optical sensor according to the actual configuration, wherein the primary image processor and the secondary image processor are configured to receive, from the optical sensor, image data generated by the optical sensor based on the captured image frame.

In certain aspects, the first desired configuration includes one or more of a first frame rate, a first resolution, or a first exposure, as indicated by a first application utilizing the optical sensor, and the second desired configuration comprises one or more of a second frame rate, a second resolution, or a second exposure, as indicated by a second application utilizing the optical sensor.

In certain aspects, the first desired configuration comprises a first plurality of desired optical sensor configurations listed according to a preference of the primary image processor, and the second desired configuration comprises a second plurality of desired optical sensor configurations listed according to a preference of the secondary image processor.

In certain aspects, the operations 600 include receiving, by the control arbiter, an indication of whether the optical sensor is allowed to be reconfigured after configuration of the optical sensor according to the actual configuration, wherein the indication is communicated by the primary image processor.

In certain aspects, the operations 600 include receiving, by a rectifier, a rectification recipe generated by the secondary image processor for the second desired configuration, the rectification recipe communicated to the rectifier by the secondary image processor, and adjusting, by the rectifier, the image data generated by the optical sensor based on the rectification recipe.

In certain aspects, the rectification recipe comprises one or more of: a list of processing steps for downgrading the image data generated by the optical sensor, or an indication of an innocuous frame to use as a stand-in for the image data.

In certain aspects, the operations 600 include determining, by the control arbiter, that the first desired configuration is common to the second desired configuration, and setting, by the control arbiter, the actual optical sensor configuration according to the first desired configuration based on the determination that the first desired configuration is common to the second desired configuration.

In certain aspects, the operations 600 include communicating, by the control arbiter, a rectification recipe corresponding to the second desired configuration to the rectifier, wherein the rectification recipe is configured to downscale the image data generated by the optical sensor as indicated by a second application utilizing the optical sensor.

In certain aspects, determining the actual optical sensor configuration for generating the image frame further comprises determining, by the control arbiter, that the first desired configuration is not common to the second desired configuration, and setting, by the control arbiter, the actual optical sensor configuration according to the first desired configuration.

ADDITIONAL CONSIDERATIONS

In some configurations, the term(s) 'communicate,' 'communicating,' and/or 'communication' may refer to 'receive,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for" or simply as a "block" illustrated in a figure.

These apparatus and methods described in the detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise. The software may be stored on non-transitory computer-readable medium included in the processing system.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

What is claimed is:

1. A system on a chip (SoC), comprising:
a primary image processor;
a secondary image processor; and
a control arbiter communicatively coupled to: the secondary image processor, the primary image processor, and an optical sensor, wherein the control arbiter is configured to:
  receive, from the primary image processor, a first desired configuration for capturing an image frame by the optical sensor, the first desired configuration comprising one or more of a first frame rate, a first resolution, or a first exposure, as indicated by a first application utilizing the optical sensor;
  receive, from the secondary image processor, a second desired configuration for capturing the image frame by the optical sensor, the second desired configuration comprising one or more of a second frame rate, a second resolution, or a second exposure, as indicated by a second application utilizing the optical sensor;
  determine an actual configuration for capturing the image frame by the optical sensor, the actual configuration based on the first desired configuration and the second desired configuration;
  configure the optical sensor according to the actual configuration, wherein the primary image processor and the secondary image processor are configured to receive, from the optical sensor, image data generated by the optical sensor based on the actual configuration; and
  receive, from the primary image processor, an indication of whether the optical sensor is allowed to be reconfigured after configuration of the optical sensor according to the actual configuration.

2. The SoC of claim 1, wherein:
the first desired configuration comprises a first plurality of desired optical sensor configurations listed according to a preference of the primary image processor; and
the second desired configuration comprises a second plurality of desired optical sensor configurations listed according to a preference of the secondary image processor.

3. The SoC of claim 1, further comprising a rectifier configured to:
  receive, from the secondary image processor, a rectification recipe generated by the secondary image processor for the second desired configuration; and
  adjust the image data generated by the optical sensor based on the rectification recipe.

4. The SoC of claim 3, wherein the rectification recipe comprises one or more of:

a list of processing steps for downgrading the image data generated by the optical sensor; or an indication of an innocuous frame to use as a stand-in for the image data.

5. The SoC of claim 3, wherein the control arbiter, being configured to determine the actual configuration for capturing the image frame by the optical sensor, is further configured to:

determine that the first desired configuration is common to the second desired configuration; and set the actual configuration according to the first desired configuration based on the determination that the first desired configuration is common to the second desired configuration.

6. The SoC of claim 5, wherein:

the control arbiter is further configured to communicate the rectification recipe corresponding to the second desired configuration to the rectifier, and the rectification recipe is configured to downscale the image data generated by the optical sensor as indicated by the second application utilizing the optical sensor.

7. The SoC of claim 3, wherein the control arbiter, being configured to determine the actual configuration for generating the image frame by the optical sensor, is further configured to:

determine that the first desired configuration is not common to the second desired configuration; and set the actual configuration according to the first desired configuration.

8. A method of sharing a single optical sensor between multiple image processors, the method comprising:

receiving, at a control arbiter from a primary image processor, a first desired configuration for capturing an image frame by an optical sensor;

receiving, at the control arbiter from a secondary image processor, a second desired configuration for capturing the image frame by the optical sensor;

receiving, by a rectifier, a rectification recipe generated by the secondary image processor for the second desired configuration, the rectification recipe communicated to the rectifier by the secondary image processor;

determining, by the control arbiter, an actual configuration for capturing the image frame by the optical sensor, the actual configuration based on the first desired configuration and the second desired configuration;

configuring, by the control arbiter, the optical sensor according to the actual configuration wherein the primary image processor is configured to receive, from the optical sensor, image data generated by the optical sensor based on the actual configuration; and adjusting, by the rectifier, the image data generated by the optical sensor based on the rectification recipe, wherein the secondary image processor is configured to receive, from the rectifier, the adjusted image data.

9. The method of claim 8, wherein:

the first desired configuration comprises one or more of a first frame rate, a first resolution, or a first exposure, as indicated by a first application utilizing the optical sensor; and the second desired configuration comprises one or more of a second frame rate, a second resolution, or a second exposure, as indicated by a second application utilizing the optical sensor.

10. The method of claim 9, wherein:

the first desired configuration comprises a first plurality of desired optical sensor configurations listed according to a preference of the primary image processor; and the second desired configuration comprises a second plurality of desired optical sensor configurations listed according to a preference of the secondary image processor.

11. The method of claim 9, further comprising receiving, by the control arbiter, an indication of whether the optical sensor is allowed to be reconfigured after configuration of the optical sensor according to the actual configuration, wherein the indication is communicated by the primary image processor.

12. The method of claim 8, wherein the rectification recipe comprises one or more of:

a list of processing steps for downgrading the image data generated by the optical sensor; or an indication of an innocuous frame to use as a stand-in for the image data.

13. The method of claim 8, further comprising:

determining, by the control arbiter, that the first desired configuration is common to the second desired configuration; and setting, by the control arbiter, the actual configuration according to the first desired configuration based on the determination that the first desired configuration is common to the second desired configuration.

14. The method of claim 13, further comprising communicating, by the control arbiter, the rectification recipe corresponding to the second desired configuration to the rectifier, wherein the rectification recipe is configured to downscale the image data generated by the optical sensor as indicated by a second application utilizing the optical sensor.

15. The method of claim 8, wherein determining the actual configuration for generating the image frame further comprises:

determining, by the control arbiter, that the first desired configuration is not common to the second desired configuration; and setting, by the control arbiter, the actual configuration according to the first desired configuration.

16. An apparatus for sharing a single optical sensor between multiple image processors, comprising:

means for receiving a first desired configuration for capturing an image frame by the optical sensor, the first desired configuration communicated from a primary image processor, the first desired configuration comprising one or more of a first frame rate, a first resolution, or a first exposure, as indicated by a first application utilizing the optical sensor;

means for receiving a second desired configuration for capturing the image frame by the optical sensor, the second desired configuration communicated from a secondary image processor the second desired configuration comprising one or more of a second frame rate, a second resolution, or a second exposure, as indicated by a second application utilizing the optical sensor;

means for determining an actual configuration for capturing the image frame by the optical sensor, the actual configuration based on the first desired configuration and the second desired configuration;

means for configuring the optical sensor according to the actual configuration, wherein the primary image processor and the secondary image processor are configured to receive, from the optical sensor, image data generated by the optical sensor based on the actual configuration; and means for receiving, from the primary image processor, an indication of whether the optical sensor is allowed to be reconfigured after configuration of the optical sensor according to the actual configuration.

\* \* \* \* \*